United States Patent
Kuroda

(10) Patent No.: US 8,356,825 B2
(45) Date of Patent: Jan. 22, 2013

(54) STABILIZER DEVICE AND PROCESS FOR PRODUCTION THEREOF

(75) Inventor: Shigeru Kuroda, Yokohama (JP)

(73) Assignee: NHK Spring Co., Ltd., Yokohama-shi (JP)

( * ) Notice: Subject to any disclaimer, the term of this patent is extended or adjusted under 35 U.S.C. 154(b) by 89 days.

(21) Appl. No.: 12/936,013

(22) PCT Filed: Apr. 13, 2009

(86) PCT No.: PCT/JP2009/057445
§ 371 (c)(1),
(2), (4) Date: Oct. 14, 2012

(87) PCT Pub. No.: WO2009/128423
PCT Pub. Date: Oct. 22, 2009

(65) Prior Publication Data
US 2011/0025013 A1 Feb. 3, 2011

(30) Foreign Application Priority Data
Apr. 14, 2008 (JP) ................ 2008-104567

(51) Int. Cl.
*B60G 21/055* (2006.01)
*B60G 11/20* (2006.01)

(52) U.S. Cl. ... 280/124.106; 280/124.137; 280/124.149; 280/124.166; 267/189; 267/276

(58) Field of Classification Search ........... 280/124.106, 280/124.13, 124.137, 124.149, 124.152, 280/124.166, 124.169; 267/188, 189, 273, 267/276

See application file for complete search history.

(56) References Cited

U.S. PATENT DOCUMENTS

| | | | | |
|---|---|---|---|---|
| 5,884,926 A | * | 3/1999 | Muzio et al. | 280/124.107 |
| 6,889,988 B2 | * | 5/2005 | Cai et al. | 280/124.107 |
| 6,971,640 B2 | * | 12/2005 | Joseph | 267/141 |
| 7,065,875 B2 | * | 6/2006 | Cai et al. | 29/897.2 |
| 7,128,328 B2 | * | 10/2006 | Torongo | 280/124.107 |
| 7,318,593 B2 | * | 1/2008 | Sterly et al. | 280/124.106 |
| 7,500,685 B2 | * | 3/2009 | Cai et al. | 280/124.106 |

(Continued)

FOREIGN PATENT DOCUMENTS

| | | |
|---|---|---|
| EP | 0 405 109 A1 | 1/1991 |
| EP | 0 900 677 A1 | 3/1999 |

(Continued)

OTHER PUBLICATIONS

European Search Report dated Nov. 4, 2011 in European Patent Application No. 09733408.0.

(Continued)

*Primary Examiner* — Eric Culbreth
*Assistant Examiner* — Barry Gooden, Jr.
(74) *Attorney, Agent, or Firm* — Oliff & Berridge, PLC

(57) ABSTRACT

A stabilizer device having high reliability and light weight is provided. The stabilizer device has a stabilizer consisting of a torsion part and arm parts each extending from both ends of the torsion part and having an overall shape of a square bracket, a "]" shape, a bushing for fixing the stabilizer to an automobile body arranged at both ends of the torsion part, and a resin misalignment preventing member which has a contacting part contacting with the bushing, which is arranged neighboring the bushing, and which is integrally formed with the torsion part and covering all therearound in a predetermined range of axial direction of the torsion part.

10 Claims, 6 Drawing Sheets

U.S. PATENT DOCUMENTS

| | | | |
|---|---|---|---|
| 7,621,513 B2 * | 11/2009 | Owen et al. | 267/273 |
| 7,635,139 B2 * | 12/2009 | Narishima et al. | 280/124.13 |
| 2002/0170177 A1 | 11/2002 | Koyama et al. | |
| 2004/0090033 A1 * | 5/2004 | Cai et al. | 280/124.107 |
| 2004/0207135 A1 * | 10/2004 | Joseph | 267/141.1 |
| 2005/0077663 A1 * | 4/2005 | Owen et al. | 267/188 |
| 2005/0110234 A1 * | 5/2005 | Cai et al. | 280/124.107 |
| 2005/0180812 A1 | 8/2005 | Torongo | |
| 2005/0214560 A1 * | 9/2005 | Yue et al. | 428/600 |
| 2006/0181046 A1 * | 8/2006 | Cai et al. | 280/124.107 |
| 2006/0200990 A1 | 9/2006 | Koyama et al. | |
| 2007/0074940 A1 * | 4/2007 | Narishima et al. | 188/321.11 |
| 2007/0085295 A1 | 4/2007 | Johnson et al. | |
| 2007/0194549 A1 * | 8/2007 | Germano et al. | 280/124.107 |
| 2008/0036166 A1 * | 2/2008 | Russell et al. | 280/124.107 |
| 2008/0093817 A1 * | 4/2008 | Russell | 280/124.106 |
| 2008/0111335 A1 * | 5/2008 | DiNello | 280/124.106 |
| 2009/0058031 A1 * | 3/2009 | Johnson et al. | 280/124.152 |
| 2010/0244395 A1 * | 9/2010 | Sugiura et al. | 280/124.107 |
| 2011/0115182 A1 * | 5/2011 | Kuroda | 280/124.106 |
| 2011/0169242 A1 * | 7/2011 | Kuroda | 280/124.165 |
| 2011/0278811 A1 * | 11/2011 | Ohletz et al. | 280/124.106 |

FOREIGN PATENT DOCUMENTS

| | | |
|---|---|---|
| JP | A-2001-163026 | 6/2001 |
| JP | A-2001-165127 | 6/2001 |
| JP | A-2002-331326 | 11/2002 |
| JP | A-2007-050777 | 3/2007 |

OTHER PUBLICATIONS

International Search Report issued in International Patent Application No. PCT/JP2009/057445 dated Jun. 23, 2009.

Oct. 8, 2012 Office Action issued in Chinese Patent Application No. 200980122431.2 (with translation).

* cited by examiner

Fig. 10A
Fig. 10B
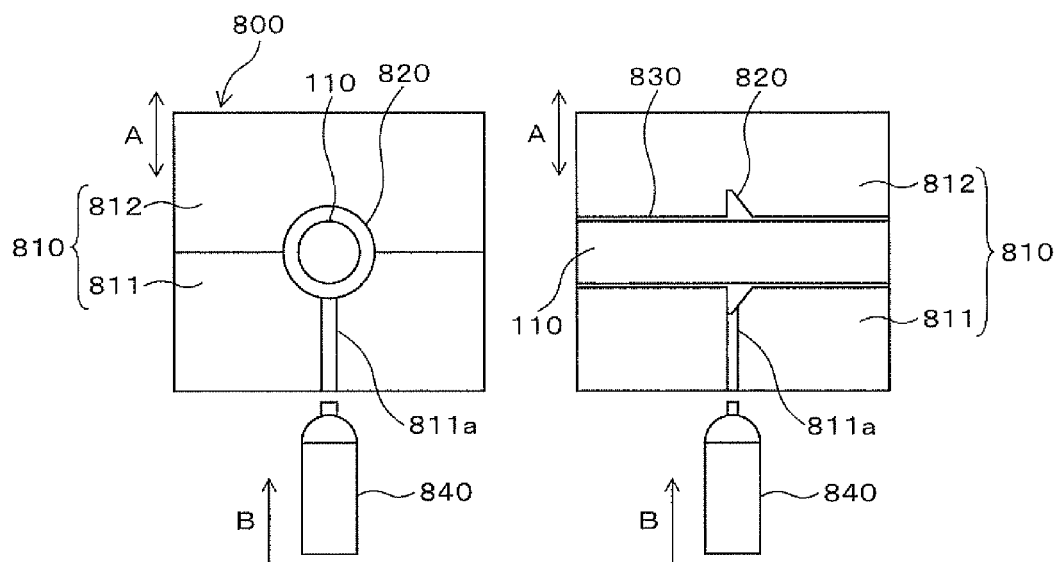
Fig. 11
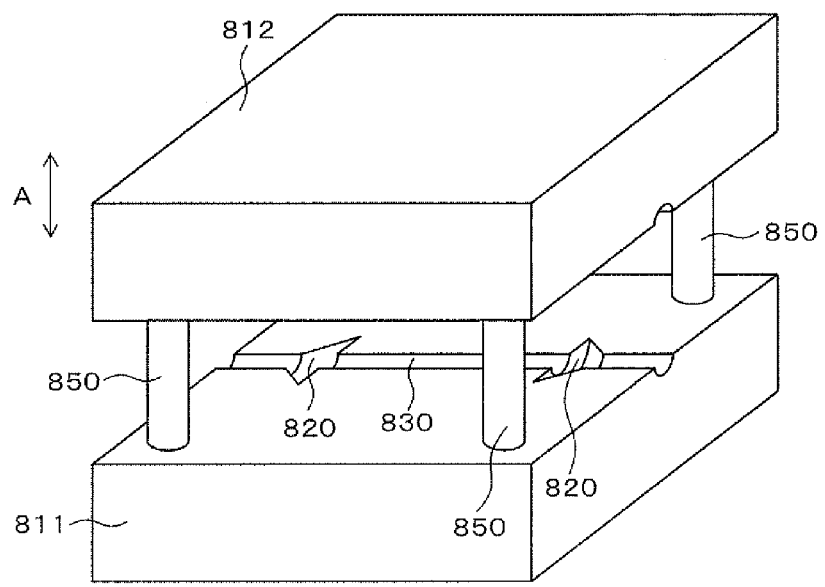

STABILIZER DEVICE AND PROCESS FOR PRODUCTION THEREOF

TECHNICAL FIELD

The present invention relates to a stabilizer device, which may be mounted on an automobile or the like, and relates to a process for production thereof.

BACKGROUND ART

A stabilizer in the stabilizer device functions as a spring, restraining horizontal oscillation of an automobile body by warping a left arm part and a right arm part in mutually opposing directions, and by contorting a torsion part, when mutually opposing phases in the up and down direction are applied to the suspension mechanisms on the left and right, when an automobile having such a stabilizer device passes through a curve. Conventionally, the stabilizer has been fixed to the automobile body by fastening a bracket to an automobile body side with a bolt via a rubber bushing arranged on the stabilizer.

However, due to a load generated by centrifugal force when passing through a curve, the torsion part and the bushing may each resist the frictional force of the other, so that they become misaligned with each other. These misaligned parts will not be returned to their original positions even in the case in which a centrifugal force is generated in an opposite direction or in the case in which the automobile then goes straight, and thus the parts would be maintained misaligned from the original positions. Therefore, there may be a problem in which anti-roll effects by the stabilizer cannot be obtained, a problem in which excessive load may be applied on a stabilink fastened on both ends of the stabilizer, and there is a likely problem that the stabilizer may interfere at a circumferential part.

To prevent the bushing from being misaligned, an aluminum ring or an iron ring has been swaged as a misalignment preventing member. As the misalignment preventing member, one member for each of the left and right, in total two members, are used per one stabilizer. On the other hand, as a method for preventing the bushing from being misaligned, there is a method in which a rubber bushing itself is directly fixed to the torsion part by an adhesive or by a heat-curing process.

In a process for production of a hollow stabilizer device having the aluminum ring as the misalignment preventing member, first, a forming process in which an electric resistance welded tube cut into a predetermined length is formed into a shape of a stabilizer by a cold-working is performed, next, a heat treatment process in which the half-finished product of the stabilizer is heat-treated by, for example, quenching or tempering is performed, next, shot-peening in which shot is impinged on the half-finished product of the stabilizer is performed, and next, a coating process in which the half-finished product of the stabilizer is coated is performed. After that, the aluminum ring consisting of half portions or two pieces is swaged to obtain the misalignment preventing member.

In addition, in a process for production of a hollow stabilizer device having the iron ring as the misalignment preventing member, first, an arm part is formed by a bending process of an electric resistance welded tube cut into predetermined length, next, the electric resistance welded tube is bent and is inserted into an iron ring formed into a C-shape, and next, a process in which a flattened part and an attachment hole for attaching a stabilink are formed at an edge part of the arm part by forging or the like is performed. After that, the iron ring is swaged and a coating process is performed.

On the other hand, in the process for fixing a rubber bushing, the rubber bushing is integrally formed at the torsion part of the stabilizer by direct injection, and it is then hardened by a heat curing process. As cited references concerning these techniques, Japanese Unexamined Patent Application Publication Nos. 2001-163026 and 2001-165127 may be mentioned.

However, since it is a method for fixing in which an aluminum ring consisting of half portions or two pieces are swaged to the torsion part, the aluminum ring has a connecting part which is a structural weak point. Because of this connecting part, the strength of the aluminum ring is low. Therefore, in the case in which a load is applied to the aluminum ring, the swaged form may be easily broken. Therefore, the fixing strength of the aluminum ring may be easily deteriorated, and fixed positions of the stabilizer at left and right parts of the automobile may become unbalanced. When the automobile passes through a curve, the effects that the stabilizer originally had cannot be sufficiently obtained. As a result, it is not a stabilizer device having sufficient reliability.

In addition, since the aluminum ring is swaged and fixed to the half finished product of the stabilizer after coating, the ring is fixed to the stabilizer via coating. Therefore, it may depend on the coating strength, which is a degree of adhering between the half-finished product of the stabilizer and the coating. Therefore, in the case in which the original coating strength is not obtained, the misalignment preventing member may move with the coating, the fixing strength of which the misalignment preventing member originally has cannot be obtained, and the function as the misalignment preventing member cannot be obtained. As a result, it is not a stabilizer device having sufficient reliability. Furthermore, in the case in which the misalignment preventing member is an aluminum ring or an iron ring, it is heavier than the misalignment preventing member made of resin. Therefore, weight reduction of the stabilizer device cannot be promoted.

In addition, since deformation resistance of the iron ring is higher than that of the aluminum ring, the iron ring is formed into a circular shape so as to be swaged easily. Therefore, it is necessary that the torsion part be inserted into the ring before the flattened part and the attaching hole for attaching the stabilink are formed at the edge part of the arm part by forging or the like. That is, it is necessary that the electric resistance welded tube be inserted into the iron ring after bending the electric resistance welded tube and before coating of the half-finished product of the stabilizer. Therefore, handling is difficult since the process for forming the flattened part and attaching hole must be performed while the iron ring is maintained so as not to drop off or fall without swaging it.

Furthermore, since the rubber bushing requires the heat curing process, the process for production becomes complicated and is expensive. In addition, in the direct injection of rubber, part of the rubber forms burrs and projects from a gap between a shoulder part of a stabilizer and a grip part of a mold supporting the shoulder part of the stabilizer. For example, it has been demonstrated that the burrs are formed even in the case in which the gap is about 0.2 mm. Therefore, a process for removing the burrs is necessary, incurring additional costs.

DISCLOSURE OF THE INVENTION

Therefore, an object of the present invention is to provide a stabilizer device having high reliability and which is light in weight.

The stabilizer device of the present invention has a stabilizer consisting of a torsion part and arm parts each extending from both ends of the torsion part and forming an overall shape of a square bracket, a "]" shape, a bushing for fixing the stabilizer to an automobile body arranged at both ends of the torsion part, and a resin misalignment preventing member which has a contacting part contacting with the bushing, which is arranged neighboring with the bushing, and which is integrally formed with the torsion part while covering all therearound in a predetermined range of an axial direction of the torsion part.

As the resin, polyphenylene sulfide, polyetheretherketone or the like is desirable. For example, with a material such as polyphenylene sulfide or polyetheretherketone, if a condition of injection when the misalignment preventing member is directly injected is appropriately selected, generation of burrs can be prevented. Furthermore, a material such as polyphenylene sulfide or polyetheretherketone has enough heat resistance and strength to withstand heat in a coating process in which a coating of a stabilizer is dried that is performed after the injection forming process of the misalignment preventing member.

By the present invention, since the misalignment preventing member does not have a connecting part which is a structural weak point, loss of fixing strength at the torsion part of the stabilizer by a load can be prevented, and the bushing is maintained at an appropriate position of the torsion part. In addition, while the aluminum ring loses the ability to act as the misalignment preventing member immediately in the case in which load is applied on the aluminum ring, on the other hand, in the case in which the resin misalignment preventing member is misaligned, a load that is required to be misaligned is little changed. Therefore, the misalignment preventing member can maintain the function as the misalignment preventing member, of which the bushing is prevented from moving along the axial direction of the torsion part. As a result, the stabilizer can exhibit the performance preliminarily designed, and the reliability can be increased. On the other hand, since the misalignment preventing member is made of resin, the weight is lighter than that of an aluminum ring or an iron ring. Therefore, weight reducing of the stabilizer device can be promoted.

In the present invention, it is desirable that the misalignment preventing member have an inclining part on the contacting part at the opposite side of the bushing, whose outer diameter is decreased as it is far from the bushing along the axial direction of the torsion part. As such an inclining part, the inclining part can be of a tapered shape, and the cross section shape of the inclining part can be parabolic or circular.

In the present invention, it is desirable that the misalignment preventing member have plural ribs on the contacting part at the opposite side of the bushing, whose outer diameter is decreased as it is far from the bushing along the axial direction of the torsion part. As such a rib, the inclining part can be a tapered shape, and the cross section shape of the inclining part can be parabolic or circular.

According to the above aspect, in the case in which centrifugal force is generated at the automobile body, the load is applied on the bracket arranged on the outer circumference of the bushing. If the load is applied like this, the bushing is bent toward the misalignment preventing member. In this way, the load is applied to an outer circumferential part of a contacting part of the misalignment preventing member. Therefore, a moment acts in the misalignment preventing member toward the axial direction of the torsion part. That is, the inner circumferential surface of the misalignment preventing member presses the outer circumferential surface of the torsion part, and the load is applied from the misalignment preventing member to the torsion part. Therefore, frictional force between the torsion part and the misalignment preventing member is increased, and further higher frictional force is exhibited. As a result, the bushing is prevented from being misaligned, and therefore reliability of the stabilizer device can be increased.

Furthermore, by reducing excessive material, the misalignment preventing member can be prevented from interfering with surrounding parts of the member, and the cost and the weight can be reduced because of reducing resin used. In addition, during the coating process which is performed after the misalignment preventing member is formed, the risk of uneven coating around the misalignment preventing member, which occurs by the misalignment preventing member shielding the coating, can be reduced. Furthermore, in the case of ribs, compared to the case of the inclining part, the cost and the weight can be further reduced because of further reducing resin used.

In the present invention, it is desirable that the misalignment preventing member be formed so as to be 10 mm to 15 mm long in the axial direction of the torsion part. In this aspect, while realizing the reduction in size of the misalignment preventing member, the frictional force which can bear against the load generated when contacting the bushing and the misalignment preventing member by the centrifugal force generated when the automobile passes through a curve, can be exhibited. Therefore, the straight length of the torsion part (excluding the bushing) of the stabilizer can be shortened as much as possible, and the stabilizer can be reduced in size. As a result, the weight of the stabilizer can be reduced.

In the present invention, it is desirable that the misalignment preventing member be formed so as to be 3 mm to 5 mm thick at the thickest portion. In this aspect, while the misalignment preventing member can be reduced in size, an area in which the contacting part as the misalignment preventing member contacts the bushing is maintained. Therefore, the misalignment preventing member can be prevented from interfering with surrounding parts of the member, and the weight of the stabilizer device can be reduced.

In the present invention, it is desirable that convex and concave portions which prevent misalignment of the torsion part and the misalignment preventing member be arranged on an outer circumferential surface of the torsion part. As the concave and convex portions, methods for reducing roughness by shotblasting or shotpeening, forming dimples, forming projections, forming linear projections, or forming linear grooves may be mentioned. It should be noted that forming the concave and convex part by shotpeening is desirable since the number of processes is increased in the production of the stabilizer device if the dimples, projections, linear projections, and linear grooves are formed. In this aspect, because of the anchor effect, resistance to misalignment, which prevents the bushing from misaligning, can be further increased. Therefore, the misalignment preventing member can further prevent the bushing from moving along the axial direction of the torsion part. As a result, the reliability of the stabilizer can be increased.

The process for production of the stabilizer device of the present invention has following processes, a forming process in which a bar material is formed into an overall shape of a square bracket, a "]" shape, a heat treatment process in which the half-finished product of the stabilizer is heated, a shot peening process in which shot is impinged on the half-finished product of the stabilizer, an injection forming process in which a misalignment preventing member is integrally formed at shoulder part of the half-finished product of the stabilizer with a resin by direct injection, and a coating process in which the half-finished product of the stabilizer and the misalignment preventing member are coated.

By the present invention, since the misalignment preventing member does not have a connecting part which is a structural weak point, immediate loss of fixing strength at the torsion part of the stabilizer by load can be prevented, and the bushing is maintained at an appropriate position of the torsion part. In addition, while the aluminum ring loses the ability as the misalignment preventing member immediately in the case in which load is applied on the aluminum ring, on the other hand, in the case in which the resin misalignment preventing member is misaligned, load required to be misaligned is little changed. Therefore, the misalignment preventing member can maintain the function as the misalignment preventing member, of which the bushing is prevented from moving along the axial direction of the torsion part. As a result, the stabilizer can exhibit the performance preliminarily designed, and the reliability can be increased. On the other hand, since the misalignment preventing member is made of resin, the weight is lighter than that of an aluminum ring or an iron ring. Therefore, weight reduction of the stabilizer device can be promoted.

Furthermore, since the coating process is performed after the misalignment preventing member is integrally formed, the misalignment preventing member is not fixed to the shoulder part via the coating (meaning fixed directly), the fixing strength of the misalignment preventing member is not affected by the coating strength which is a degree of coating adhering to the half-finished product of the stabilizer. Therefore, even in the case in which the original coating strength is not obtained, the misalignment preventing member does not move together with the coating, the fixing strength of the misalignment preventing member can be obtained, and the function as the misalignment preventing member can be exhibited sufficiently.

In the present invention, it is desirable that a mold be used in the injection forming process, the mold has a cavity for forming the misalignment preventing member in predetermined shape and has a grip part being arranged so as to be continuous with the cavity and supporting the shoulder part of the half-finished product of the stabilizer, and in addition, a gap between the shoulder part and the grip part is not more than 0.6 mm during the direct injection. In this aspect, resin filled in the cavity does not flow from the cavity into the grip part, and burrs are not generated. Therefore, in the case of a resin misalignment preventing member having a length of 10 mm for example, diameter tolerance of the torsion part, bending of the torsion part inside of the misalignment preventing member, or the like, is widely allowed. In addition, a process for removing the burrs can be omitted. As a result, the stabilizer device can be produced at low cost.

In the present invention, a stabilizer having high reliability and light weight can be produced.

BRIEF DESCRIPTION OF DRAWINGS

FIG. 10 is a diagram showing the injection forming apparatus.
FIG. 11 is an oblique view showing the mold.

EXPLANATION OF REFERENCE NUMERALS

1: Stabilizer device, 10: Automobile body, 100: Stabilizer, 110: Torsion part, 111: Convex and concave part, 300: Bushing, 400: Misalignment preventing member, 410: Contacting part, 420: Tapered part, 520: Parabolic part, 620: Rib, 720: Rib, 810: Mold, 820: Cavity, 830: Grip part.

BEST MODE FOR CARRYING OUT THE INVENTION

Construction of Stabilizer Device

Figure 1:
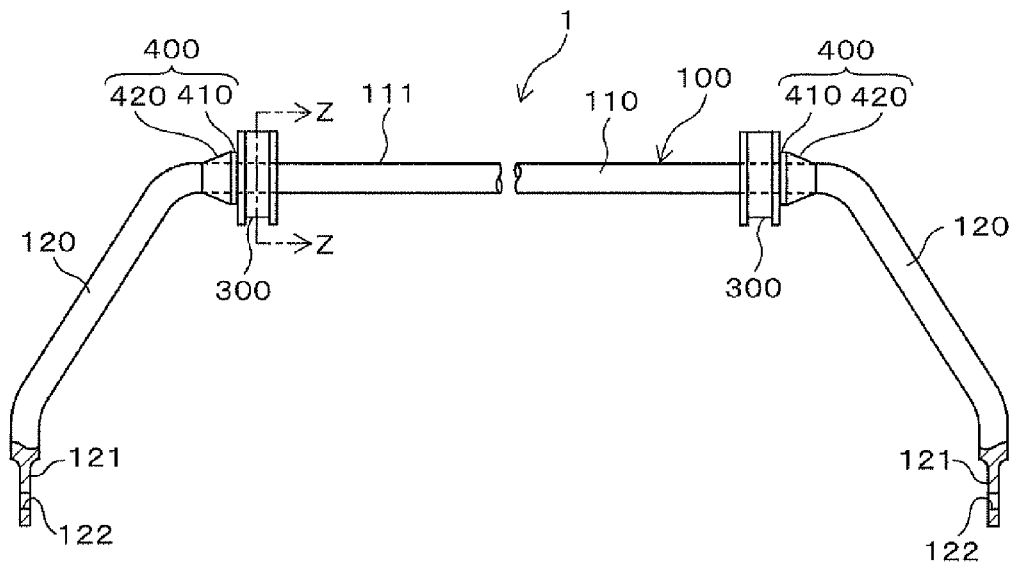
FIG. 1 is a diagram showing the stabilizer device.
Figure 2:
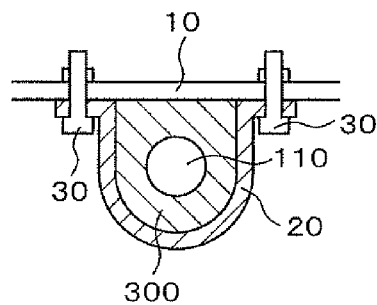
FIG. 2 is a cross sectional view seen from line Z-Z in FIG. 1 showing a condition being fixed to an automobile body.
Figure 3:
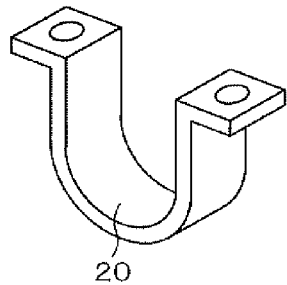
FIG. 3 is an oblique view showing the bracket.
Figure 4A:
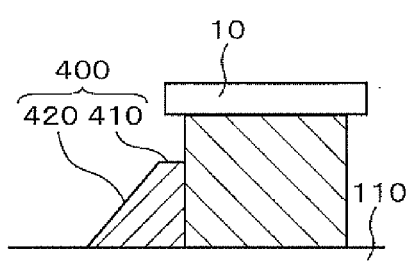
FIG. 4 is a cross sectional view showing a circumference of the misalignment preventing member being enlarged.
Figure 4B:
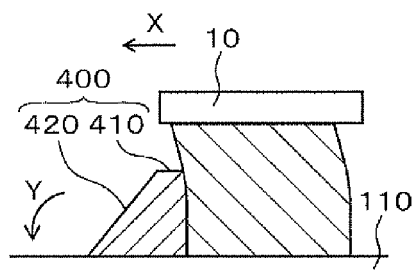
Figure 4B:
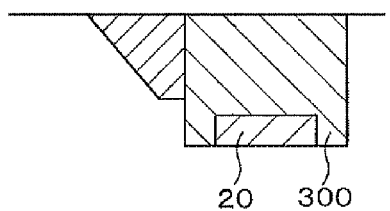
Figure 4B:
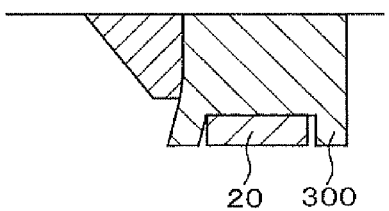
Figure 5A:
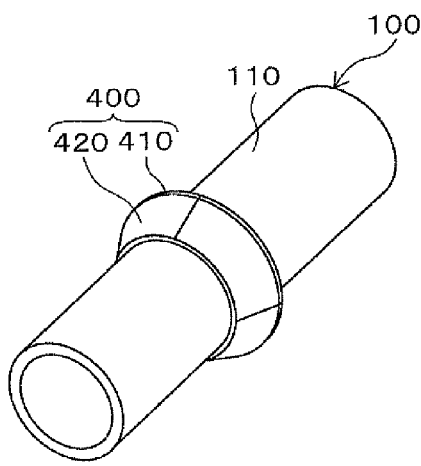
FIG. 5 is an oblique view showing the misalignment preventing member.
Figure 5B:
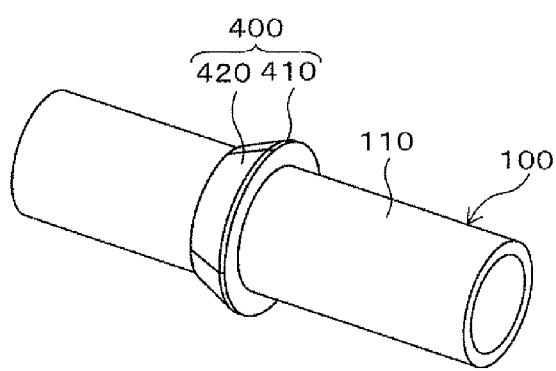
Figure 6:
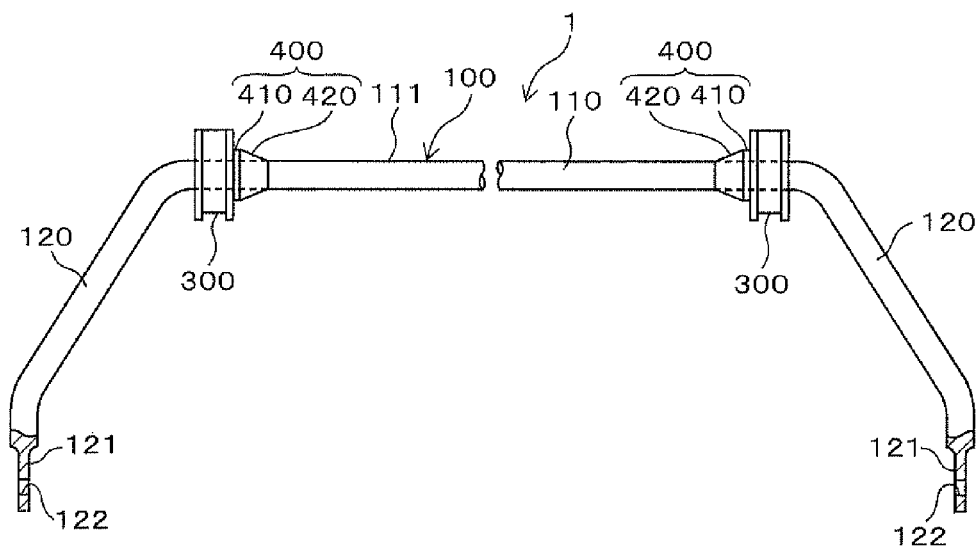
FIG. 6 is a diagram showing the embodiment in which the misalignment preventing member is arranged inside.
Figures 7A, 7B:
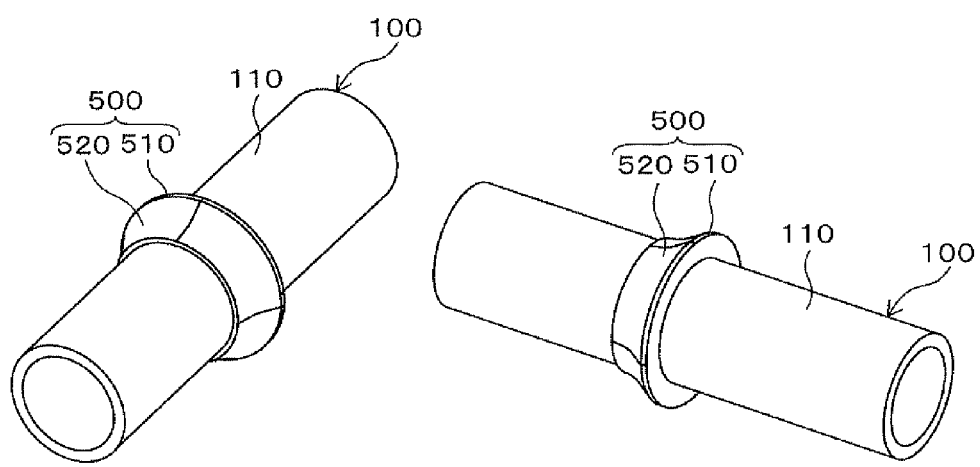
FIG. 7 is a diagram showing a first variation of the misalignment preventing member.
Figure 8A:
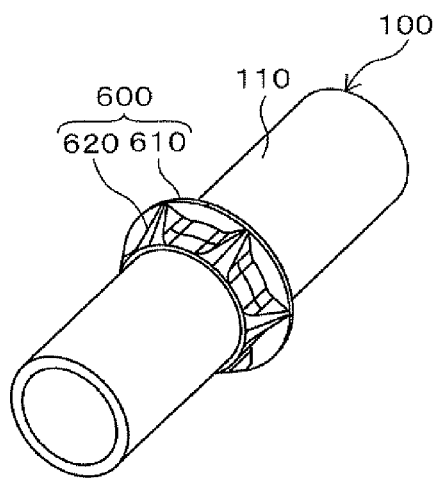
FIG. 8 is a diagram showing a second variation of the misalignment preventing member.
Figure 8B:
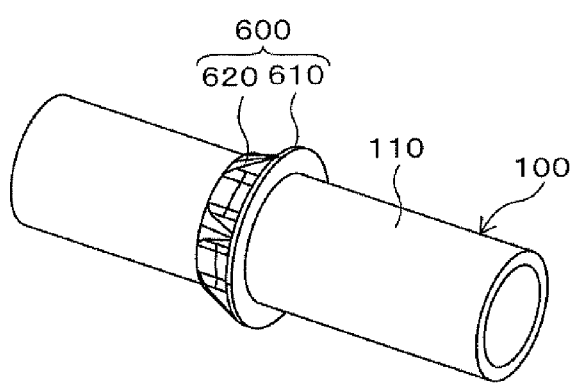
Figure 9A:
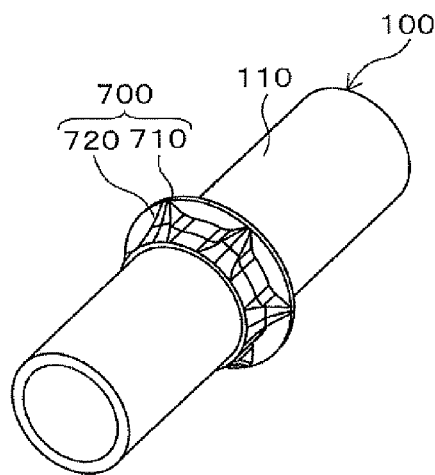
FIG. 9 is a diagram showing a third variation of the misalignment preventing member.
Figure 9B:
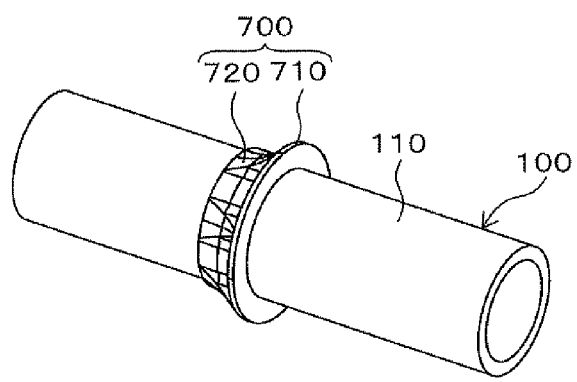

Hereinafter, an embodiment of the invention will be explained by referring to the drawings. FIG. 1 is a diagram showing the stabilizer device. FIG. 2 is a cross sectional view seen from line Z-Z in FIG. 1 showing a condition being fixed to an automobile body. FIG. 3 is an oblique view showing the bracket. FIG. 4 is a cross sectional view showing a circumference of the misalignment preventing member enlarged. FIG. 4A is a diagram showing a condition in which centrifugal force is not generated. FIG. 4B is a diagram showing a condition in which centrifugal force is generated. FIG. 5 is an oblique view showing the misalignment preventing member. FIG. 6 is a diagram showing the embodiment in which the misalignment preventing member is arranged inside. FIG. 7 is a diagram showing a first variation of the misalignment preventing member. FIG. 8 is a diagram showing a second variation of the misalignment preventing member. FIG. 9 is a diagram showing a third variation of the misalignment preventing member.

As shown in FIG. 1, the stabilizer device 1 has the stabilizer 100, bushing 300, and the misalignment preventing members 400 or the like. The stabilizer 100 has the torsion part 110, and the arm parts 120. In the stabilizer 100, the torsion part 110 and the arm parts 120 are formed by processing a bar material such as a hollow pipe such as an electric resistance welded tube or solid pipe. At both end parts of the torsion part 110, a pair of left arm and right arm 120, each extending from both end parts are arranged. At the top part of the arm part 120, the flattened part 121 which is flattened by forging is formed. At the flattened part 121, the attaching hole 122 for attaching a stabilizer link, not shown, by insertion is formed.

The stabilizer 100 in the stabilizer device 1 functions as a spring restraining horizontal oscillation of an automobile body 10 by deforming a left arm part and a right arm part 120 in opposite directions and by deforming the torsion part 110, when opposing phases in the up and down direction are applied in suspension mechanisms of the left and right (not shown), when an automobile having such stabilizer device 1 passes through a curve.

The torsion part 110 is linear and is formed in a solid or hollow cylindrical shape. On the outer circumferential surface of the torsion part 110, concave and convex part 111 formed by shotpeening is formed. On the torsion part 110, the bushing 300 for attaching the stabilizer device 1 onto the automobile body 10 is provided. Furthermore, on the torsion part 110, the misalignment preventing member 400 preventing the bushing 300 from being misaligned is provided.

As shown in FIG. 1, the bushing 300 is attached to each of left and right of the torsion part 110. The bushing 300 is made of rubber, and is formed bigger than the misalignment preventing member 400. As shown in FIGS. 2 and 4, the bushing 300 is a member to fix the stabilizer 100 to the automobile body 10, by tightening the letter U shape bracket 20 which is surrounding outer circumference of the bushing 300 shown in FIG. 3 by a bolt to the automobile body 10 side.

The misalignment preventing member 400 is made of resin. As the resin forming the misalignment preventing member 400, polyphenylenesulfide or polyetheretherketone or the like may be mentioned. The misalignment preventing member 400 is integrally formed with the torsion part 110 while covering all therearound in a predetermined range of axial direction of the torsion part 110.

Since the misalignment preventing member 400 is integrally formed in this way, the misalignment preventing member 400 does not have a connecting part which is a structural weak point, easy loss of fixing strength at the torsion part 110 of the stabilizer 100 by load can be prevented, and the bushing 300 is maintained at an appropriate position of the torsion part 110. In addition, while the aluminum ring loses the ability as the misalignment preventing member immediately in the case in which load is applied on the aluminum ring, on the other hand, in the case in which the resin misalignment preventing member 400 is misaligned, load required to be misaligned is little changed. Therefore, the misalignment preventing member 400 can maintain the function as the misalignment preventing member, of which the bushing 300 is prevented from moving along the axial direction of the torsion part 110. As a result, the stabilizer 100 can exhibit the performance preliminarily designed, and the reliability can be increased.

As shown in FIG. 1, the misalignment preventing member 400 is arranged neighboring to the outside of the bushing 300. That is, the misalignment preventing member 400 is arranged at each of the left and right of the torsion part 110, and in total, two members are arranged. The misalignment preventing member 400 has the contacting part 410 and the inclining part 420. The misalignment preventing part 400 prevents the bushing 300 from moving along the axial direction of the torsion part 110.

It should be noted that the present invention is not limited in the embodiment in which each misalignment member 400 is arranged neighboring to the outside of the bushing 300. As shown in FIG. 6, even in the case in which each misalignment member 400 is arranged neighboring to the inside of the bushing 300, the function as the misalignment preventing member can be exhibited.

The misalignment preventing member 400 is formed so as to be 10 mm to 15 mm long. Therefore, while the misalignment preventing member 400 is reduced in size, resistance to misalignment which prevents the bushing 300 from being misaligned by the centrifugal force generated when the automobile passes through a curve can be exhibited. Therefore, in the stabilizer 100, straight length of the torsion part 110 excluding the bushing 300 can be shortened as much as possible, and the stabilizer 100 can be reduced in size. As a result, weight of the stabilizer device 1 can be reduced. It should be noted that the length of the misalignment member 400 is determined according to the resistance to misalignment required to prevent the bushing 300 from being misaligned by the centrifugal force generated when the automobile passes through a curve.

Furthermore, in the present embodiment, since the convex and concave part 111 is existing at the contacting part of the torsion part 110 and the misalignment preventing member 400, since resistance to misalignment is large even in the case in which the misalignment preventing member 400 is short, length of the misalignment preventing member 400 can be further shortened.

As shown in FIG. 5 or the like, the contacting part 410 is formed to have a flanged shape. The side surface of the bushing 300 contacts the side surface of the contacting part 410. The contacting part 410 is a part at which the thickness is greatest in the misalignment preventing member 400, and is formed to have a thickness of 3 mm to 5 mm. Therefore, while the misalignment preventing member 400 can be reduced in size, an area in which the contacting part 410 as the misalignment preventing member 400 contacts the bushing 300 can be maintained, and the misalignment preventing member 400 can be prevented from interfering with the surrounding parts of the misalignment preventing member 400. As a result, the weight of the stabilizer device 1 can be reduced.

As shown in FIG. 5 or the like, the tapered part 420 is formed to having a tapered shape. That is, the tapered part 420 is formed on the contacting part 410 at the opposite side of the bushing 300 so that the outer diameter is decreased as it is far from the bushing 300 along axial direction of the torsion part 110.

It should be noted that the present invention is not limited to the embodiment in which the tapered part 420 is arranged. As shown in FIG. 7, by forming so that the cross section of the inclining part is parabolic, the parabolic part 520 in which constituent material is reduced compared to the tapered part 420 can be formed. Alternatively, the tapered shaped rib 620 in which constituent material is further reduced compared to the tapered part 420 and the parabolic part 520 as shown in FIG. 8 can be formed, or the rib 720 in which the cross section of the inclining part is parabolic as shown in FIG. 9 can be formed.

By reducing the constituent material as much as possible in this way, the misalignment preventing member can be prevented from interfering with the surrounding part of the misalignment preventing member, and the cost and the weight can be reduced because of reducing the resin used. Furthermore, during the coating process which is performed after the misalignment preventing member is formed, the risk of uneven coating around the misalignment preventing member, which occurs by the misalignment preventing member shielding the coating, can be reduced.

Regarding weight reduction of the misalignment preventing member, in the case of the misalignment preventing member of an aluminum ring for example, in the case in which a misalignment preventing member which is arranged at a stabilizer having a diameter of 25.4 mm is designed, it would have a cylindrical shape with a thickness of 5.0 mm, a length of 15.0 mm, and a weight of 16 g. On the other hand, in the case in which the misalignment preventing member 700 made of resin shown in FIG. 9 which is arranged at a stabilizer having a diameter of 25.4 mm is designed, it would have a weight of 5 g, and thus, about 11 g per part of weight reduction can be obtained. Therefore, since the two misalignment preventing members are arranged on one stabilizer, total weight reduction of 22 g can be obtained.

Hereinafter, the fact that the misalignment preventing member 400 can exhibit higher frictional force than a conventional misalignment preventing member such as an aluminum ring or an iron ring is explained by referring to FIG. 4.

In the case in which centrifugal force is generated on the automobile body 10 in the X direction indicated by the arrow, load is applied on the bracket 20 arranged at the outer circumference of the bushing 300. When the load is applied in this way, as shown in FIG. 4(b), the bushing 300 is deformed to the misalignment preventing member 400 side. In this way, load is applied at the outer circumferential part of the contacting part 410 of the misalignment preventing member 400. Therefore, a moment is applied to the misalignment preventing member 400 toward the axial direction of the torsion part 110 (Y direction indicated by the arrow in FIG. 4). That is, the inner circumferential surface of the misalignment preventing member 400 presses the outer circumferential surface of the torsion part 110, and load is applied from the misalignment preventing member 400 to the torsion part 110. Therefore, frictional force between the torsion part 110 and the misalignment preventing member 400 is increased, and higher frictional force can be exhibited. As a result, the bushing 300 is prevented from being misaligned, and reliability of the stabilizer device 1 can be increased. Furthermore, since the convex and concave part 111 is formed, high resistance to misalignment can be exhibited.

Process for Production of Stabilizer Device

Figure 12:
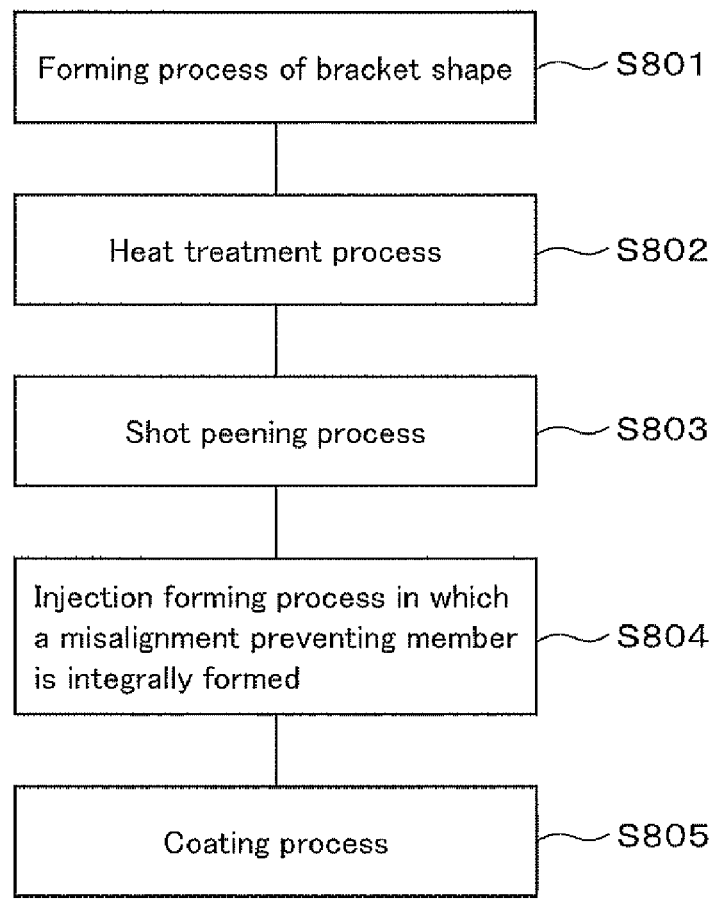
FIG. 12 is a flow chart diagram showing a part of the process for production of the stabilizer device.

Next, part of the process for production of the stabilizer device 1 is explained by referring to the figures. From the forming process to the coating process is explained. FIG. 10 is a diagram showing the injection forming apparatus. FIG. 10(a) is a cross section of the injection forming apparatus in the perpendicular direction of the axial direction of the torsion part. FIG. 10(b) is a cross section of the injection forming apparatus in the axial direction of the torsion part. FIG. 11 is an oblique view showing the mold. FIG. 12 is a flow chart diagram showing a part of the process for production of the stabilizer device.

Hereinafter, the injection forming apparatus 800 in which the misalignment preventing member 400 is directly injected to the half-finished product of the stabilizer is explained by referring to the FIGS. 10 and 11. As shown in FIG. 10, the injection forming apparatus 800 has the mold 810, the injecting machine 840, up-and-down mechanism 850 and so on. The mold 810 has the lower mold 811 and the upper mold 812. The gate 811a is arranged at the lower mold 811. On the lower mold 811 and the upper mold 812, the concave part which is a part of the cavity 820 to form the misalignment preventing member 400 in a predetermined shape, and the grip part 830 which is continuously arranged at the cavity 820 and supports the shoulder part of the half-finished product of stabilizer, are arranged.

The injecting machine 840 is an apparatus to fill resin into the cavity 820 of the mold. The up-and-down mechanism 850 is arranged at each of four corners of the mold 810. The up-and-down mechanism 850 lifts the upper mold 812 up and down in the direction A indicated by the arrows in FIGS. 10 and 11. The up-and-down mechanisms 850 are arranged at predetermined intervals so that the half-finished product of the stabilizer can go through between the up-and-down mechanisms 850 along the direction of which the grip part 830 is formed.

When the upper mold 812 goes upward by the up-and-down mechanism 850 along the direction A indicated by the arrow in FIG. 10, the upper mold 812 is separated from the lower mold 811. On the other hand, when the upper mold 812 goes downward by the up-and-down mechanism 850 along the direction A indicated by the arrow in FIG. 10, the upper mold 812 comes into contact with the lower mold 811. When the lower mold 811 and the upper mold 812 are in contact, the cavity 820 in which the misalignment preventing member 400 is formed into a predetermined shape is formed.

A part of the process for production of the stabilizer device 1 is explained by referring to the FIG. 12. First, a forming process in which bar material such as an electric resistance welded tube cut into predetermined length is formed so as to have a shape like that of a square bracket, a "]" shape, by a cold-working is performed (S801). Next, a heat treatment process in which the half-finished product of the stabilizer is heat-treated by for example quenching or tempering is performed (S802). Next, shot-peening in which shot is impinged on the half-finished product of the stabilizer is performed, burrs or the like on the surface of the torsion part 110 are removed, while the convex and concave part 111 is formed on the torsion part 110 of the half-finished product of stabilizer (S803).

Next, using the injection forming apparatus 800, an injection forming process in which the misalignment preventing member 400 is integrally formed on the half-finished product of stabilizer processed as mentioned above with resin by direct injection, is performed (S804).

During the injection forming process, first, the shoulder part of the half-finished product of stabilizer is set into the grip part 830 of the mold 810. Next, by the up-and-down mechanism 850, the upper mold 812 is lifted downwardly along the direction A indicated by the arrow in FIG. 11 to contact with the lower mold 811, so as to form the cavity 820. Next, the injecting machine 840 is moved in the direction B indicated by the arrow in FIG. 10, the top of the injecting machine 840 is inserted into the gate 811a of the lower mold 811, and the resin is filled from the gate 811a into the cavity 830. In this way, the misalignment preventing member 400 consisting of the contacting part 410 and the tapered part 420 is formed on the half-finished product of the stabilizer.

At this time, gap between the shoulder part of the half-finished product of the stabilizer and the grip part 830 is not more than 0.6 mm. Therefore, resin which is filled into the cavity 820 does not flow from the cavity 820 into the grip part 830, and therefore burrs are not formed. For example, in the case in which the misalignment preventing member 400 is about 10 mm long, the misalignment preventing member 400 can be formed even if the axial core of the misalignment preventing member 400 and the axial core of the shoulder part are relatively inclined about 3 to 4 degrees. Therefore, in the case in which the resin misalignment preventing member is about 10 mm long, diameter tolerance of the shoulder part and bent condition of the shoulder part of the inside of the misalignment preventing member 400 can be allowed to a greater degree. In addition, a process removing the burrs can be omitted. As a result, the stabilizer device 1 can be produced at low cost.

After that, coating process in which the half-finished product of the stabilizer and the misalignment preventing member 400 are coated is performed (S805). Therefore, the misalignment preventing member 400 is not fixed to the stabilizer 100 via coating (meaning fixed directly), fixing strength of the misalignment preventing member 400 is not affected by coating strength which is a degree of coating adhering to the half-product of the stabilizer. As a result, in the case in which original coating strength is not obtained, the misalignment preventing member may not move with the coating, fixing strength of the misalignment preventing member can be obtained, and reliability of the stabilizer device 1 can be increased.

In the case in which the mold is constructed so that the mold can be divided into a mold part for forming the cavity 820 and a mold part for forming the grip part 830, the number of the molds for forming the cavity 820 can be reduced to be from ⅓ to ¼ compared to variation of molds for forming an aluminum ring, and therefore, a process for working out a plan or the like can be performed efficiently. As a result, production efficiency of the stabilizer device 1 can be increased.

As explained above, the present invention can be utilized for a stabilizer device equipped in an automobile body or the like.

The invention claimed is:

1. A stabilizer device comprising:
a stabilizer having a torsion part and arm parts each extending from one of two ends of the torsion part and forming an overall shape of a square bracket, a "]" shape;
a bushing for fixing the stabilizer to an automobile body arranged at both ends of the torsion part; and
a misalignment preventing member made of resin which has a contacting part in contact with the bushing, which is arranged to neighbor the bushing, and which is integrally formed with and continuously, circumferentially covers an entirety of the torsion part in a predetermined range of an axial direction of the torsion part.

2. The stabilizer device according to claim 1, wherein the misalignment preventing member has an inclining part on the contacting part at a side opposite of the bushing, whose outer diameter is tapered from the bushing along the axial direction of the torsion part.

3. The stabilizer device according to claim 1, wherein the misalignment preventing member has a plurality of ribs on the contacting part at a side opposite of the bushing, whose outer diameter is tapered from the bushing along the axial direction of the torsion part.

4. The stabilizer device according to claim 1, wherein the misalignment preventing member is formed so as to be 10 to 15 mm long in the axial direction of the torsion part.

5. The stabilizer device according to claim 1, wherein the misalignment preventing member is formed so as to be 3 to 5 mm thick at the thickest portion.

6. The stabilizer device according to claim 1, wherein convex and concave portions which prevent misalignment of the torsion part and the misalignment preventing member are arranged at an outer circumferential surface of the torsion part.

7. A process for production of the stabilizer device according to claim 1, the process comprising:
a forming process in which a bar material having the form of a square bracket, a "]" shape, is formed into a half-finished product of the stabilizer;
a heat treatment process in which the half-finished product of the stabilizer is heated;
a shot peening process in which shot is impinged on the half-finished product of the stabilizer;
an injection forming process in which a misalignment preventing member is integrally formed at a shoulder part of the half-finished product of the stabilizer with resin by direct injection; and
a coating process in which the half-finished product of the stabilizer and the misalignment preventing member are coated.

8. The process for production according to claim 7, wherein a mold is used in the injection forming process, the mold having a cavity for forming the misalignment preventing member in a predetermined shape and having a grip part being arranged so as to be continuous with the cavity and supporting the shoulder part of the half-finished product of the stabilizer, and
wherein a gap between the shoulder part and the grip part is not more than 0.6 mm during the direct injection.

9. A stabilizer device comprising:
a stabilizer having
a torsion part, and
arm parts extending from both ends of the torsion part and forming an overall shape of a square bracket, a "]" shape;
a bushing configured to fix the stabilizer to an automobile body arranged at the both ends of the torsion part; and
a misalignment preventing member made of resin, the misalignment preventing member
having a contacting part that contacts the bushing,
having a plurality of ribs on the contacting part at a side opposite to the bushing whose outer diameter is tapered from the bushing along an axial direction of the torsion part,
being arranged proximate to the bushing, and
being integrally formed with the torsion part.

10. A stabilizer device comprising:
a stabilizer having
a torsion part, and
arm parts extending from both ends of the torsion part and forming an overall shape of a square bracket, a "]" shape;
a bushing configured to fix the stabilizer to an automobile body arranged at the both ends of the torsion part; and
a misalignment preventing member made of resin, the misalignment preventing member
having a contacting part that contacts the bushing,
being formed so as to be 10 mm to 15 mm long in an axial direction of the torsion part,
being arranged proximate to the bushing, and
being integrally formed with the torsion part.

* * * * *